(12) United States Patent
Blazer et al.

(10) Patent No.: US 12,339,507 B2
(45) Date of Patent: *Jun. 24, 2025

(54) SZ STRANDED TIGHT-BUFFERED RIBBON STACKS WITH BINDER FILM

(71) Applicant: CORNING RESEARCH & DEVELOPMENT CORPORATION, Corning, NY (US)

(72) Inventors: Bradley Jerome Blazer, Granite Falls, NC (US); Julian Latelle Greenwood, III, Greensboro, NC (US); Warren Welborn McAlpine, Hickory, NC (US); David Alan Seddon, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,123

(22) Filed: Sep. 14, 2023

(65) Prior Publication Data
US 2023/0418012 A1 Dec. 28, 2023

Related U.S. Application Data

(63) Continuation of application No. 17/739,355, filed on May 9, 2022, now Pat. No. 11,782,229, which is a
(Continued)

(51) Int. Cl.
*G02B 6/44* (2006.01)
(52) U.S. Cl.
CPC ........... *G02B 6/443* (2013.01); *G02B 6/4434* (2013.01); *G02B 6/448* (2013.01); *G02B 6/4486* (2013.01)

(58) Field of Classification Search
CPC ...... G02B 6/443; G02B 6/4434; G02B 6/448; G02B 6/4486
(Continued)

(56) References Cited

U.S. PATENT DOCUMENTS

| 4,331,378 A | 5/1982 | Hartig |
| 4,496,214 A | 1/1985 | Oestreich et al. |

(Continued)

FOREIGN PATENT DOCUMENTS

WO 2015/102817 A1 7/2015

OTHER PUBLICATIONS

European Patent Application No. 20183793.7 Communication pursuant to Article 94(3) EPC dated Feb. 22, 2023; 6 Pages; European Patent Office.
(Continued)

*Primary Examiner* — Jerry M Blevins
(74) *Attorney, Agent, or Firm* — Thomas R. Irwin (57) ABSTRACT

An optical fiber cable including a central strength member, a first plurality of tight-buffered ribbon stacks, a binder film, and a cable sheath. The central strength member extends along a longitudinal axis of the optical fiber cable. The tight-buffered ribbon stacks are SZ-stranded around the central strength member. An interstitial space is provided between adjacent tight-buffered ribbon stacks. A binder film continuously and contiguously surrounds the first plurality of tight-buffered ribbon stacks along the longitudinal axis. The binder film includes first portions and at least one second portion. Each of the at least one second portion of the binder film extends into one of the interstitial spaces of the first plurality of tight-buffered ribbon stacks. The cable sheath continuously and contiguously surrounds the binder film along the longitudinal axis, and the cable sheath is coupled to the first portions of the binder film.

19 Claims, 5 Drawing Sheets

Related U.S. Application Data continuation of application No. 16/916,297, filed on Jun. 30, 2020, now Pat. No. 11,340,414.

(60) Provisional application No. 62/869,920, filed on Jul. 2, 2019.

(58) Field of Classification Search
USPC .......................................................... 385/103
See application file for complete search history.

(56) References Cited

U.S. PATENT DOCUMENTS

| | | | |
|---|---|---|---|
| 5,517,591 A | | 5/1996 | Wagman et al. |
| 5,621,842 A | * | 4/1997 | Keller .................. G02B 6/4411 |
| | | | 385/112 |
| 6,188,821 B1 | | 2/2001 | McAlpine et al. |
| 6,321,013 B1 | | 11/2001 | Hardwick et al. |
| 6,453,098 B2 | | 9/2002 | Elisson et al. |
| 6,546,712 B2 | | 4/2003 | Moss et al. |
| 6,671,441 B1 | | 12/2003 | Bocanegra et al. |
| 6,768,845 B1 | | 7/2004 | Suetsugu et al. |
| 6,895,150 B2 | | 5/2005 | Stingl |
| 7,630,605 B2 | | 12/2009 | Bringuier et al. |
| 8,620,124 B1 | | 12/2013 | Blazer et al. |
| 9,188,754 B1 | | 11/2015 | Risch et al. |
| 9,733,443 B2 | | 8/2017 | Blazer et al. |
| 10,388,434 B1 | | 8/2019 | Gebs |
| 11,340,414 B2 | | 5/2022 | Blazer et al. |
| 11,782,229 B2 | * | 10/2023 | Blazer .................... G02B 6/443 |
| | | | 385/103 |
| 2003/0099447 A1 | | 5/2003 | Stingl |
| 2004/0240809 A1 | | 12/2004 | Tedder et al. |
| 2004/0252954 A1 | | 12/2004 | Ginocchio et al. |
| 2005/0018983 A1 | | 1/2005 | Brown et al. |
| 2008/0013899 A1 | * | 1/2008 | Gowan ................. G02B 6/4434 |
| | | | 385/113 |
| 2009/0274425 A1 | | 11/2009 | Caldwell et al. |
| 2011/0188819 A1 | * | 8/2011 | Keller .................. G02B 6/4494 |
| | | | 385/103 |
| 2014/0086543 A1 | | 3/2014 | Blazer et al. |
| 2015/0355430 A1 | * | 12/2015 | Clampitt .............. G02B 6/4431 |
| | | | 385/103 |
| 2016/0306129 A1 | | 10/2016 | Hurley et al. |
| 2017/0131496 A1 | | 5/2017 | Blazer et al. |
| 2017/0219791 A1 | | 8/2017 | Sinkfield et al. |
| 2018/0180831 A1 | | 6/2018 | Blazer et al. |
| 2019/0121043 A1 | | 4/2019 | Baucom et al. |
| 2020/0064574 A1 | * | 2/2020 | Fallahmohammadi ...................... G02B 6/448 |
| 2020/0142144 A1 | | 5/2020 | Blazer et al. |

OTHER PUBLICATIONS

Extended European Search Report and Search Opinion; 20183793.7; Mailed Oct. 22, 2020; 8 Pages; European Patent Office.

* cited by examiner

SZ STRANDED TIGHT-BUFFERED RIBBON STACKS WITH BINDER FILM

CROSS-REFERENCED TO RELATED APPLICATIONS

This application is a continuation of U.S. application Ser. No. 17/739,355 flied May 9, 2022, which is a continuation of U.S. application Ser. No. 16/916,297 filed on Jun. 30, 2020, now U.S. Pat. No. 11,340,414, which claims the benefit of priority under 35 U.S.C. § 119 of U.S. Provisional Application No. 62/869,920 filed on Jul. 2, 2019, the content of which is relied upon and incorporated herein by reference in its entirety.

BACKGROUND

The disclosure relates generally to an optical fiber ribbon cable and more particularly to an optical fiber cable having a high fiber density contained within small diameter through the use of tight-buffered ribbon stacks SZ-stranded around a central strength member and held in place by a binder film. Optical fiber cables carry data in the form of light over long distances. A variety of different optical fiber cables are used to transmit data across a network. Distribution cables carry data from a data center to various nodes where branches are split off to various network subnodes. Eventually, the optical fiber cable is subdivided to individual premises. The number of optical fibers in each leg varies as does the size of the cable and the methods of installation. Thus, cables of a variety of different types, sizes, and fiber counts are needed to efficiently service the entire network.

SUMMARY

In one aspect, the present disclosure relates to an optical fiber cable including a central strength member, a first plurality of tight-buffered ribbon stacks, a binder film, and a cable sheath. The central strength member extends along a longitudinal axis of the optical fiber cable. The tight-buffered ribbon stacks are SZ-stranded around the central strength member. An interstitial space is provided between adjacent tight-buffered ribbon stacks. A binder film continuously and contiguously surrounds the first plurality of tight-buffered ribbon stacks along the longitudinal axis. The binder film includes first portions and at least one second portion. Each of the at least one second portion of the binder film extends into one of the interstitial spaces of the first plurality of tight-buffered ribbon stacks. The cable sheath continuously and contiguously surrounds the binder film along the longitudinal axis, and the cable sheath is coupled to the first portions of the binder film In another aspect, the present disclosure relates to a method of preparing an optical fiber cable. In the method, a plurality of tight-buffered ribbon stacks are SZ-stranded around a central strength member extending along a longitudinal axis of the optical fiber cable. A binder film is extruded around the plurality of tight-buffered ribbon stacks. The binder film drawn into at least one interstitial space between adjacent tight-buffered ribbon stacks of the plurality of tight-buffered ribbon stacks. Further, the binder film is contacted with molten cable sheath material to form a cable sheath.

In still another aspect, the present disclosure relate an optical fiber cable. The optical fiber cable includes a central strength member extending along a longitudinal axis of the optical fiber cable. The optical fiber cable also includes a first plurality of tight-buffered ribbon stacks that are SZ-stranded around the central strength member. An interstitial space is provided between adjacent tight-buffered ribbon stacks. Each of the first plurality of tight-buffered ribbon stacks comprises a second plurality of optical fiber ribbons surrounded by a buffer tube, and each of the first plurality of tight-buffered ribbon stacks has a rectangular cross-section. A binder film that continuously and contiguously surrounds the first plurality of tight-buffered ribbon stacks along the longitudinal axis. The binder film includes at least one bent portion, and each of the at least one bent portion of the binder film extends into one of the interstitial spaces of the first plurality of tight-buffered ribbon stacks. Further, the optical fiber cable includes a cable sheath that continuously and contiguously surrounds the binder film along the longitudinal axis. The cable sheath has an outer surface defining an outermost surface of the optical fiber cable. In the optical fiber cable, the first plurality of tight-buffered ribbon stacks includes at least 864 optical fibers and wherein the outer surface defines an outer diameter of no more than 21.5 mm.

Additional features and advantages will be set forth in the detailed description that follows, and in part will be readily apparent to those skilled in the art from the description or recognized by practicing the embodiments as described in the written description and claims hereof, as well as the appended drawing.

It is to be understood that both the foregoing general description and the following detailed description are merely exemplary, and are intended to provide an overview or framework to understand the nature and character of the claims.

BRIEF DESCRIPTION OF THE DRAWING

The accompanying drawing is included to provide a further understanding and are incorporated in and constitute a part of this specification. The drawing illustrates one or more embodiment(s), and together with the description serves to explain principles and the operation of the various embodiments.

DETAILED DESCRIPTION

Various embodiments of an optical fiber cable containing a plurality of tight-buffered ribbon stacks SZ-stranded around a central strength member and secured with a binder film are provided. The cable as described is able to provide a high fiber density (e.g., at least 864 optical fibers) while also maintaining a small diameter (e.g., such that the optical fiber cable can be pulled through a 1" duct). As will be discussed in detail below, the binder film, in embodiments, is expanded to provide free space for the optical fiber ribbons to shift into their lowest energy positions. In another embodiment, the binder film is elastic so that the tight-buffered ribbon stacks are able to shift easily when external forces impinge upon the cable. Also disclosed herein are various methods to manufacture an optical fiber cable having a binder film extruded over SZ-stranded tight-buffered ribbon stacks. These and other aspects and advantages will be discussed in relation to the embodiments provided herein. The embodiments of the optical fiber cable disclosed herein are provided by way of example and not by way of limitation.

Figure 1:
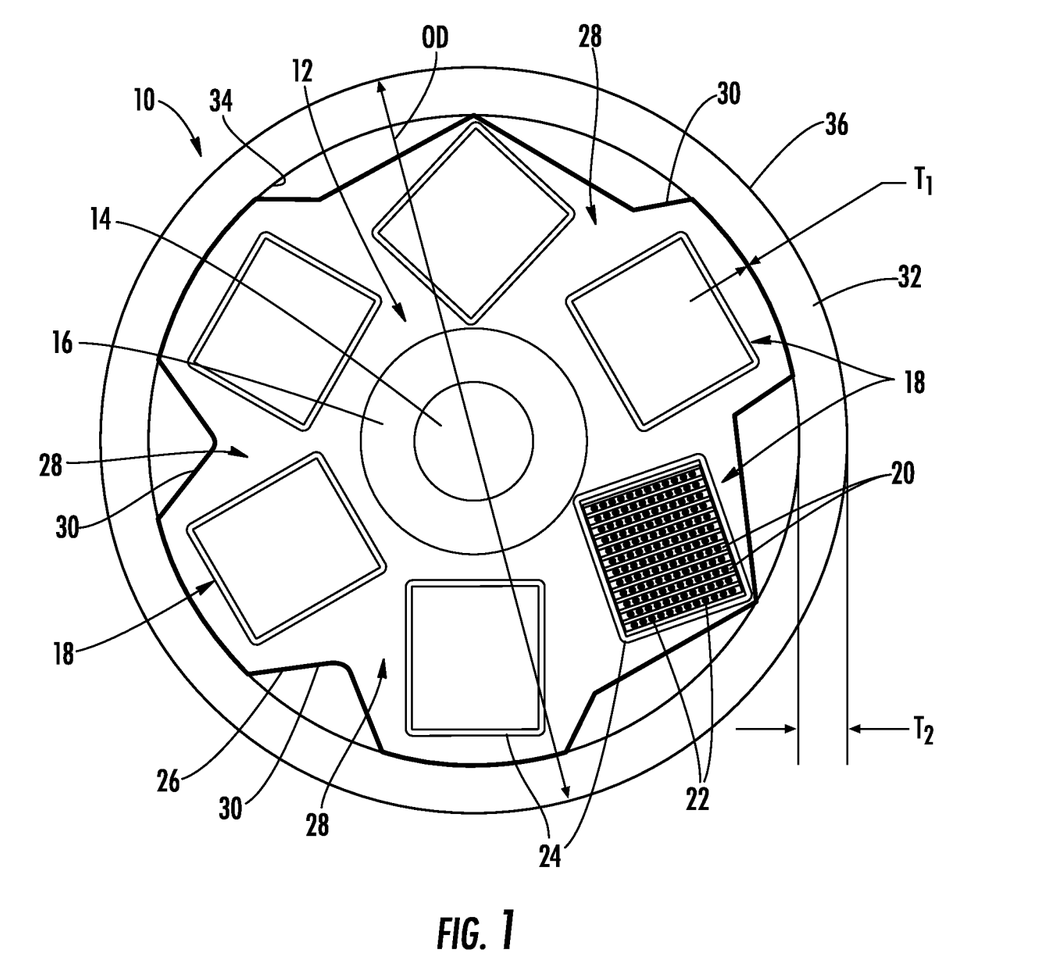
FIG. 1 depicts an optical fiber cable having SZ-stranded tight-buffered rigidly stranded ribbon stacks bound with a binder film, according to an exemplary embodiment.
Figure 4:
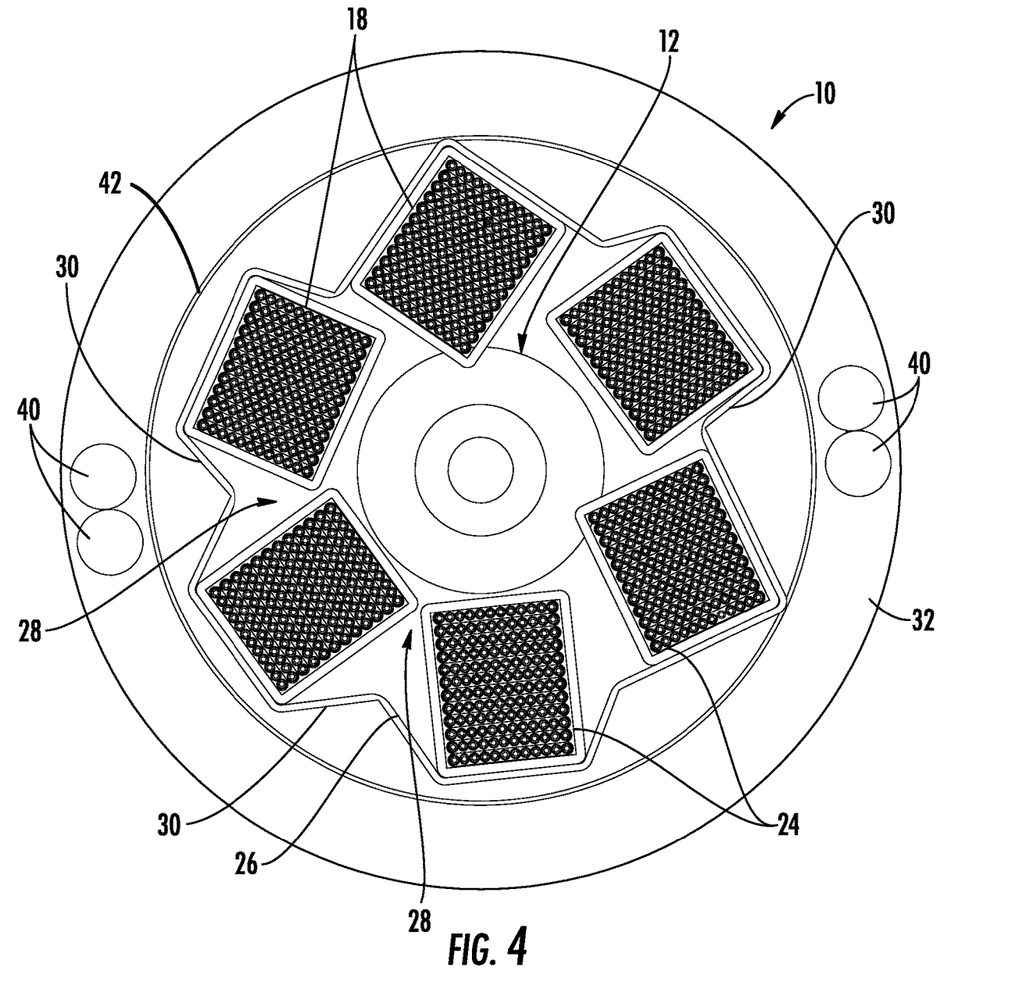
FIG. 4 depicts another embodiment of an optical fiber cable having an elastic binder film around the SZ-stranded tight-buffered ribbon stacks, according to an exemplary embodiment.

FIG. 1 depicts an embodiment of an optical fiber cable 10 according to the present disclosure. The optical fiber cable 10 includes a central strength member 12 extending along a longitudinal axis of the optical fiber cable 10. In the embodiment depicted, the central strength member 12 has a central rod element 14 and a coating layer 16. In embodiments, the central rod element 14 is a glass-reinforced plastic rod, but in other embodiments, the central rod element 14 may be, e.g., a metal wire. In embodiments, the coating layer 16 is a foamed material, such as foamed linear low density polyethylene (LLDPE). The optical fiber cable 10 has a plurality of tight-buffered ribbon stacks 18 stranded around the central strength member 12. The tight-buffered ribbon stacks 18 include a plurality of optical fiber ribbons 20. Each optical fiber ribbon 20 has a plurality of optical fibers 22 arranged in a planar row. As can be seen in FIG. 1, the optical fiber ribbons 20 are surrounded by a buffer tube 24 that is in contact with the top, bottom, and sides of the stack of optical fiber ribbons 20. The tight-buffered ribbon stacks 18 are in contrast to other cable designs that utilize a loose-tube configuration in which the stacks of optical fiber ribbons are surrounded by a substantial amount of free space within the buffer tube (e.g., 60% of the cross-sectional area being free space). Thus, as used herein, a "tight-buffered ribbon stack" refers to a stack of optical fiber ribbons surrounded by a buffer tube with there being 10% or less of free space surrounding the stack of optical fibers in a cross-sectional area within the buffer tube. As depicted in FIG. 1, only one of the tight-buffered ribbon stacks 18 shows the optical fiber ribbons 20 and optical fibers 22. The other tight-buffered ribbon stacks 18 are depicted schematically, showing only their rectangular cross-section associated with the tight buffer tube 24 and stack of ribbons 20 (FIG. 4 depicts the tight-buffered ribbon stacks 18 in more detail).

In embodiments, the optical fiber cable 10 includes from three to twelve tight-buffered ribbon stacks 18. In embodiments, each tight-buffered ribbon stack 18 includes from four to sixteen optical fiber ribbons 20, and in embodiments, each optical fiber ribbon 20 includes from four to twenty-four optical fibers 22. In the embodiment depicted, the optical fiber cable 10 includes six tight-buffered ribbon stacks 18 with each having twelve optical fiber ribbons 18, and each optical fiber ribbon 18 has twelve optical fibers 22. Thus, the optical fiber cable 10 includes 12×12×6 optical fibers 22 (or 864 optical fibers 22). In embodiments, the individual optical fibers 22, the optical fiber ribbons 20, and the tight-buffered ribbon stacks 18 are color-coded according to telecommunication standards for identification purposes.

In the embodiment depicted, the tight-buffered ribbon stacks 18 have a rectangular cross-section. In embodiments, the tight-buffered ribbons stacks 18 have a width W of from 1 mm to 10 mm and a height H of from 1 mm to 10 mm. In the embodiment depicted (having twelve optical fiber ribbons 20 with twelve optical fibers 22 each), the width is 3.6 mm and the height is 4.2 mm.

The rigidly stranded tight-buffered ribbon stacks 18 are SZ-stranded around the central strength member 12. That is, the tight-buffered ribbon stacks 18 are pre-stranded prior to SZ stranding them. In embodiments, the SZ-stranding reverses every 275.5° during stranding with a distance between reversals (S to Z or Z to S) of around 400 mm. The reversal at 275.5° is selected in embodiments because this degree of winding balances tension and compression strains on the surfaces of the tight-buffered ribbon stacks 18. Further, in embodiments, the SZ-stranding has a laylength of from 300 mm to 1200 mm. Although described with an optimal reversal at 275.5°, reversals in cables may be situated through a range of 270°-280°.

Figure 2A:
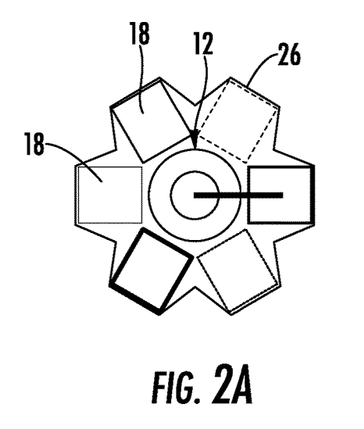
FIGS. 2A-2C depict various orientations of the tight-buffered ribbon stacks with respect to various polar positions during SZ-stranding, according to an exemplary embodiment.
Figure 2B:
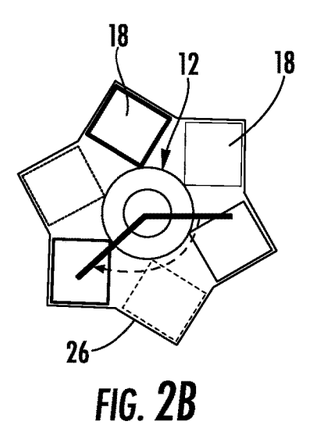
Figure 2C:
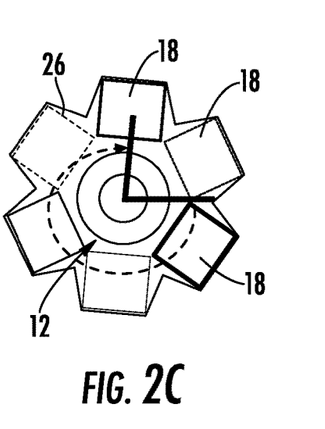
Figure 3:
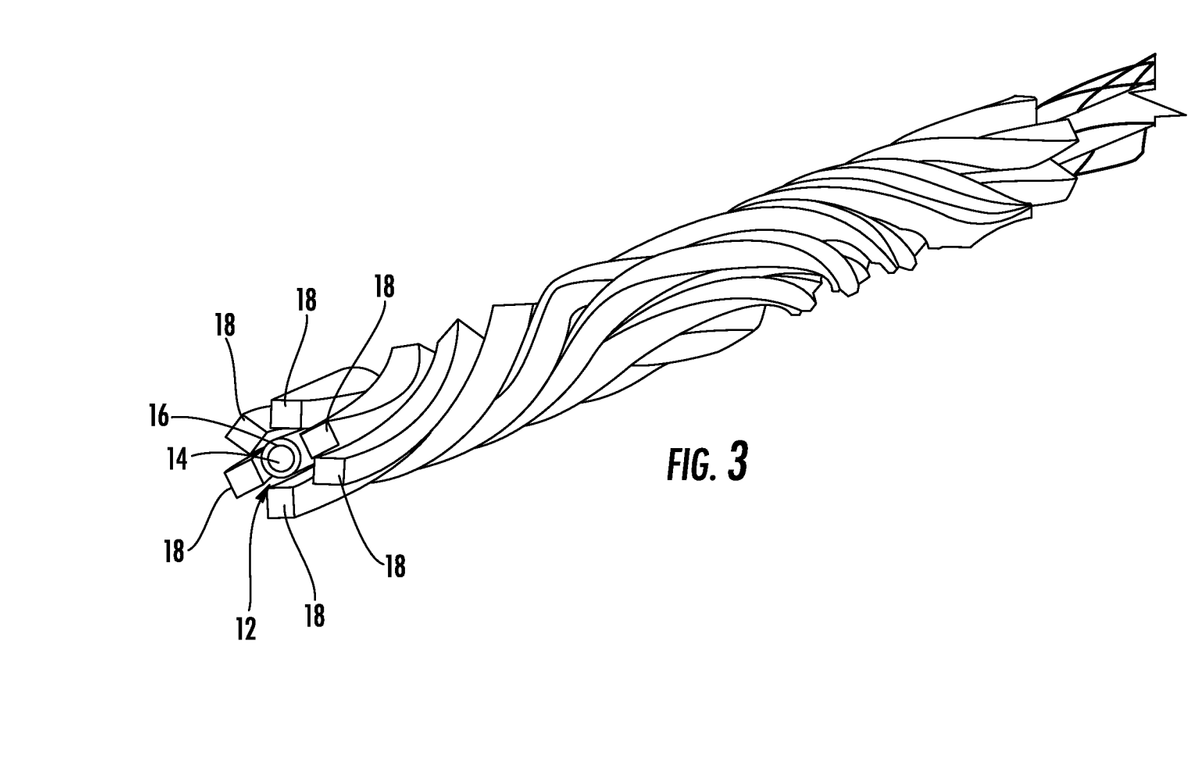
FIG. 3 depicts the reversing of SZ-stranding of the tight-buffered ribbon stacks, according to an exemplary embodiment.

FIGS. 2A-2C depict the progression of the tight-buffered ribbon stacks 18 during SZ-stranding. As shown in FIG. 2A, the optical fiber ribbon stacks 18 are each stranded around the central strength member 12 and twisted about themselves (by virtue of the pre-stranding). Thus, in FIG. 2A, the tight-buffered ribbon stacks 18 are at a 0° position with their short side against the central strength member 12. As the tight-buffered ribbon stacks 18 continue to be stranded around the central strength member 12, the corner of each tight-buffered ribbon stack 18 comes into contact with the central strength member 12 in a 137.5° position as shown in FIG. 2B. As mentioned above, the central strength member 12 may be overcoated with foam to substantially distribute the load on the diagonals of the tight-buffered ribbon stacks 18 in contact with the central member. Upon rotating 275.5° as shown in FIG. 2C, the long side of each tight-buffered ribbon stack 18 is in contact with the central strength member 12. Upon reaching the 275.5° position, the tight-buffered ribbon stacks 18 are stranded back the other direction to the 0° position. It should be noted that the depictions in FIGS. 2A-2C of the tight-buffered ribbon stacks 18 and their relative orientation at a given angular position are for illustrative purposes. The actual orientation of the tight-buffered ribbon stacks 18 for a given angular position may be different depending, e.g., on the degree of SZ-stranding and the laylength. FIG. 3 depicts a perspective view of a section of cable with the tight-buffered ribbon stacks 18 SZ-stranded around the central strength member 12. As can be seen, the stranding changes from S to Z at a reversal point. FIG. 3 also depicts the twisting (pre-stranding) of the individual tight-buffered ribbon stacks 18.

Returning to FIG. 1, the tight-buffered ribbon stacks 18 are held in their positions around the central strength member 12 by a binder film 26. In embodiments, the binder film 26 is extruded around the tight-buffered ribbon stacks 18 simultaneously with or immediately after the stranding of the tight-buffered ribbon stacks 18 around the central strength member 12. In embodiments, the binder film 26 is extruded around the tight-buffered ribbon stacks 18 while a vacuum is applied on the interior of the binder film 26. In embodiments, this causes the binder film 26 to be drawn into one or more of the interstitial spaces 28 between adjacent tight-buffered ribbon stacks 18, forming at least one bent region 30 in the binder film 26. When the binder film 26 cools, any bent regions 30 formed remain in their respective interstitial spaces 28, which helps to maintain the SZ-stranding of the tight-buffered ribbon tubes 18 around the central strength member 12.

In embodiments, the binder film 26 is formed from an elastic material, such as impact-modified polypropylene copolymer, among others. In other embodiments, the binder film 26 is formed from at least one of linear low-density polyethylene (LLDPE), a polyester, a polyamide, or a polypropylene copolymer. In embodiments, the binder film 26 has a thickness $T_1$ of from 0.02 mm to 0.15 mm.

Disposed around the binder film 26 is a cable sheath 32. The cable sheath 32 has an interior surface 34 and an exterior surface 36. In embodiments, the exterior surface 36 defines the outermost surface of the optical fiber cable 10. In embodiments, the interior surface 34 is at least partially in contact with the binder film 26. For example, in embodiments, the interior surface 34 is in contact with portions 38 of the binder film 26 between bent regions 30. In embodiments, the cable sheath 32 is extruded around the binder film 26 in such a manner that molten cable sheath material contacts the portions 38 of the binder film 26, causing the portions 38 to decrease in modulus. In embodiments, at the same time as the molten cable sheath material contacts the portions 38 of the binder film 26, the interior of the binder film 26 may be pressurized to cause the binder film 26 to expand and create free space within the binder film 26 for the tight-buffered ribbon stacks 18. In embodiments, the portions 38 that contact the molten cable sheath material expand to a greater degree than the bend regions 30. Extruding the cable sheath 32 around the binder film 26 couples the cable sheath 32 to the binder film 26. In embodiments, the binder film 26 (and interior components) are interference fit within the cable sheath 32.

In certain embodiments in which an elastic material is used for the binder film 26, the binder film 26 is not expanded while the cable sheath 32 is formed. FIG. 4 depicts an embodiment of the elastic binder film 26 embodiment. As can be seen in FIG. 4, the outermost extent of the elastic binder film 26 essentially defines the inner diameter of the cable sheath 32. Additionally, a layer of water-blocking tape 42 is wrapped around the binder film 26 such that the water-blocking tape 42 is in contact with the interior surface 34 of the cable sheath 32. As can be seen in a comparison with FIG. 1, the elastic binder film 26 keeps the tight-buffered ribbon stacks 18 tightly against the central strength member 12. As can be seen in FIG. 1, by comparison, the expanded binder film 26 does not hold the tight-buffered ribbon stacks 18 tightly against the central strength member 12 (including embedding the tight-buffered ribbon stacks 18 into the foamed coating layer 16). In embodiments of either the expanded or elastic binder film 26, the binder film 26 provides at least 40% of free space for the movement of the tight-buffered ribbon stacks 18. In other embodiments, the binder film 26 provides up to 60% of free space for movement of the tight-buffered ribbon stacks 18. The cable construction disclosed herein permits the use of continuously reversing straining lay at 275.5° which reduces the requisite free space by placing the units in a reverse bend without additional torsion.

In embodiments, the cable sheath 32 is formed from, e.g., medium density polyethylene (HDPE), or another jacketing material. In embodiments, the cable sheath 32 may include one or more strength elements 40. For example, in the embodiment shown in FIG. 4, the cable 10 includes four strength elements 40. In the embodiment of FIG. 4, the strength elements 40 are arranged in diametrically opposed pairs, which creates a preferred bend axis. In embodiments, the strength elements are, e.g., glass reinforced plastic rods or steel wires. In embodiments, the strength elements 40 have a diameter of from 1 mm to 2 mm, more particularly about 1.6 mm. In embodiments, the cable sheath 32 has a thickness $T_2$ between the inner surface 34 and the outer surface 36 that is, on average, from 2 mm to 3 mm.

In a particular, commercially envisioned embodiment, the optical fiber cable 10 has six tight-buffered ribbon stacks 18, each having twelve optical fiber ribbons 20 with twelve optical fibers 22 each for 864 total optical fibers 22. In embodiments, the optical fiber cable has an outer diameter OD of 21.5 mm or less. In other embodiments, the optical fiber cable 10 has an outer diameter OD of 20.3 mm or less, and in still other embodiments, the optical fiber cable 10 has an outer diameter OD of 20 mm or less. Further, in embodiments, the optical fiber cable 10 is able to be pulled through a 1-inch duct. The construction of the optical fiber cable 10 provides sufficient free space so that the tight-buffered ribbon stacks 18 can move without causing attenuation or fiber damage when the optical fiber cable 10 is routed around bends in a duct.

Figure 5:
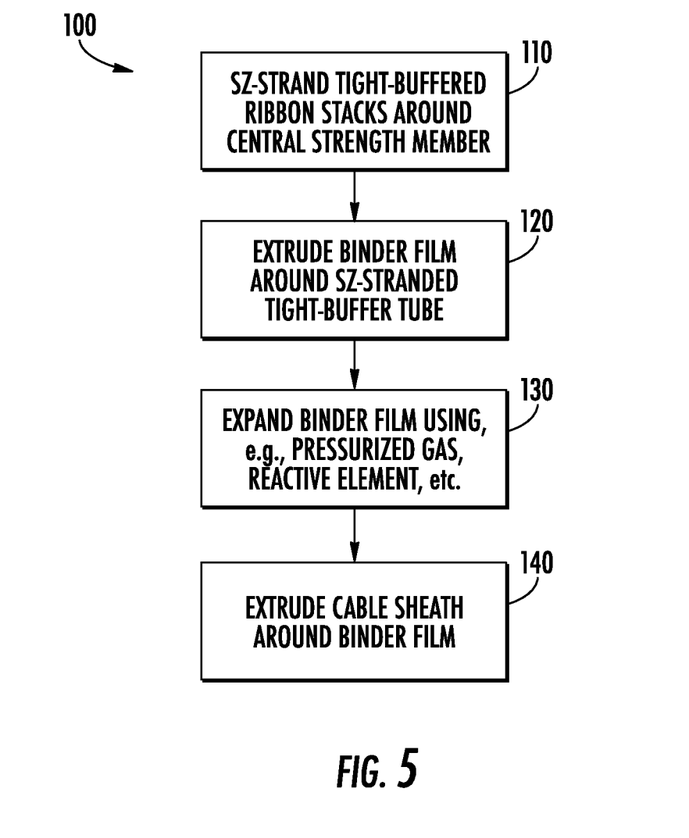
FIG. 5 is a flow diagram of a method of preparing the optical fiber cable of FIG. 1, according to an exemplary embodiment.

Having described the structure of the optical fiber cable 10, embodiments of methods of preparing the optical fiber cable 10 will now be provided. FIG. 5 depicts a flow diagram of a method 100 for manufacturing the optical fiber cable 10 according to the present disclosure. In a first step 110, the tight-buffered ribbon stacks 18 are SZ-stranded around the central strength member 12. In a particular embodiment, an SZ stranding lay-plate is extended through an extrusion crosshead. The lay-plate guides and oscillates the tight-buffered ribbon stacks 18 to introduce a helix as the tight-buffered ribbon stacks 18 are formed around the central strength member 12. In an embodiment, the tight-buffered ribbon stacks 18 are planetarily SZ stranded. Further, in embodiments, the tight-buffered ribbon stacks 18 are rigidly prestranded, and in view of their rectangular in cross section, the surface that presents itself to the central member during the planetary action of stranding changes as the each tight-buffered ribbon stack 18 forms a helix. The diagonal of each rectangular tight-buffered ribbon stack 18 is the largest dimension. The diameter of the central strength member 12 plus the unit diagonal length sum to comprise the stranding mean diameter or pitch circle of the tight-buffered ribbon stacks 18. When the tight-buffered ribbon stacks 18 are stranded around a moderately rigid or rigid central strength member 12, only the face that forms on the diagonal of the unit is tangent to the central strength member 12. The balance of each tight-buffered ribbon stack 18 does not contact the central strength member 12 as it is bent. The induced twist form the secondary stranding operation is removed by the planetary stranding action.

In a second step 120, the binder film 26 is extruded around the tight-buffered ribbon stacks 18. While the first step 110 and second step 120 are depicted as separate steps, the first step 110 and the second step 120 may be performed simultaneously, or the second step may be performed immediately after the first step 110. The first step 110 and the second step 120 are performed close together, at least in part, because the binder film 26 retains the tight-buffered ribbon stacks 18 in their SZ-stranded configuration. Additionally, a vacuum is applied on the interior of the binder film 26 to draw the binder film 26 into the interstitial spaces 28 between the tight-buffered ribbon stacks 18. While the binder film 26 cools, in embodiments, the lay of the tight-buffered ribbon stacks 18 is retained by a coupling caterpuller with opposing grooved belts.

After the binder film 26 cools, according to one embodiment of the method 100 for forming an expanded binder film 26, the binder film 26 is pressurized prior to sheathing in a third step 130. In such an embodiment, the binder film 26, tight-buffered ribbon stacks 18, and central strength member 12 are connected to a rotating union on a payoff. A pressurized air supply is provided to sustain pressure during the run.

In embodiments, the interior of the binder film 26 is pressured to, e.g., 0.5 bar (7.5 psig) with compressed air. At this pressure at room temperature, an increase in the diameter of the stranded tight-buffered ribbon stacks 18 is detectable but remains relatively tight against the central strength member 12. The interior of the film could be coated with a reactive substance such as powdered sodium bicarbonate which would release $CO_2$ gas when heated due to contact with the molten jacket polymer. A reactive element could alternatively be heated via electromagnetic induction. The central strength member 12 or other embedded element, including the buffer tubes 24 of the tight-buffered ribbon stacks 18, could function to expand the binder film 26 temporarily during application of the binder film 26 to push the stranded tight-buffered ribbon stacks 18 outward against the binder film 26 to produce the expanded binder film 26. In embodiments in which the binder film 26 is elastic, this third step 130 may be skipped.

In a fourth step 140, the binder film 26 is contacted with molten cable sheath material, which lowers the modulus of portions 38 the binder film 26. If the third step 130 is performed, the portions of the binder film 26 with lower modulus expand outward while the bent portions 30 of the binder film 26 within the interstitial spaces 28 remain cooler and only move outward while largely retaining their shape, their axial location, and their polar position in the cross section. In embodiments, this provides about free space of at least about 40% in the cross-sectional area of the expanded binder film 26. In an embodiment, a pair of opposing grooved belts engage the cable sheath 32, controlling the outward diameter excursion resulting from the induced internal pressure until the sheath modulus has increased to a level to elastically control it. In another embodiment, the outward excursion of the molten cable sheath 32 is constrained by sequential split orifices of varying diameter or the same diameter submerged in a cooling bath of water.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable, comprising:
   a plurality of tight-buffered ribbon stacks that are stranded about a longitudinal axis, wherein each of the tight-buffered ribbon stacks comprises
      a plurality of optical fiber ribbons arranged in a stack; and
      a buffer tube that is substantially conformal to the stack of the optical fiber ribbon;
   a binder film that continuously and contiguously surrounds the plurality of tight-buffered ribbon stacks along the longitudinal axis such that the plurality of tight-buffered ribbon stacks are disposed within an interior region defined by the binder film, the interior region characterized by at least 40% of free space; and
   a cable jacket that surrounds the binder film.

2. The optical fiber cable of claim 1, wherein the plurality of tight-buffered ribbon stacks are SZ-stranded with a reversing lay between 270° and 280°.

3. The optical fiber cable of claim 1, wherein the optical fiber cable further comprises a central strength member disposed along the longitudinal axis.

4. The optical fiber cable of claim 3, wherein the central strength member comprises a foam coating.

5. The optical fiber cable of claim 4, wherein the foam coating comprises linear low density polyethylene (LLDPE).

6. The optical fiber cable of claim 1, wherein each of the tight-buffered ribbon stacks has a substantially rectangular profile.

7. The optical fiber cable of claim 1, wherein each of the tight-buffered ribbon stacks comprises:
   a plurality of optical fiber ribbons arranged in a stack having a top, a bottom, and at least two sides, each of the optical fiber ribbons comprising a plurality of optical fibers arranged in a respective planar row;
   a buffer tube that is in contact with the top, the bottom, and the at least two sides of the stack.

8. The optical fiber cable of claim 7, wherein the buffer tube is characterized by a free space surrounding the stack of optical fiber ribbons in a cross-sectional area within the buffer tube, the free space being less than 10%.

9. The optical fiber cable of claim 1, wherein the binder film has a thickness of between 0.02 mm and 0.15 mm.

10. The optical fiber cable of claim 1, wherein the interior region is further characterized by less than or equal to 60% free space.

11. The optical fiber cable of claim 1, wherein the binder film comprises at least one of linear low-density polyethylene (LLDPE), a polyester, a polyamide, or a copolymer of polypropylene.

12. An optical fiber cable, comprising:
   a plurality of tight-buffered ribbon stacks that are stranded about a longitudinal axis, the tight-buffered ribbon stacks each comprising:
      a plurality of optical fiber ribbons arranged in a stack; and
      a buffer tube that is substantially conformal to the stack of the optical fiber ribbons; and
   a cable jacket having an interior surface that defines a central bore, the plurality of tight-buffered ribbon stacks disposed within the central bore, wherein at least one of the tight-buffered ribbon stacks is characterized by a free space of less than or equal to 10% between the buffer tube and the plurality of optical fiber ribbons.

13. The optical fiber cable of claim 12, further comprising:
   a binder film that continuously and contiguously surrounds the plurality of tight-buffered ribbon stacks along the longitudinal axis such that the plurality of tight-buffered ribbon stacks are disposed within an interior region defined by the binder film, the interior region characterized by at least 40% of free space.

14. The optical fiber cable of claim 13, wherein the binder film comprises at least one of linear low-density polyethylene, a polyester, a polyamide, or a copolymer of polypropylene.

15. The optical fiber cable of claim 12, further comprising a strength member disposed along the longitudinal axis, the strength member comprising at least one of a rod or wire surrounded by a foam coating.

16. The optical fiber cable of claim 12, wherein the tight-buffered ribbon stacks are characterized by a rectangular cross-sectional profile.

17. The optical fiber cable of claim 12, wherein for each of the plurality of tight-buffered ribbon stacks, the stack of optical fiber ribbons comprises a top, a bottom, and at least two sides, and wherein further, for each of the plurality of tight-buffered ribbon stacks the buffer tube contacts the top, the bottom, and the at least two sides of the stack of optical fiber ribbons.

18. The optical fiber cable of claim 12, wherein each of the tight-buffered ribbon stacks is additionally twisted about itself.

19. A cable, comprising:
A plurality of tight-buffered ribbon stacks that are stranded about a longitudinal axis, the tight-buffered ribbon stacks each comprising:
 a plurality of optical fiber ribbons arranged in a stack; and
 a buffer tube that is substantially conformal to the stack of the optical fiber ribbons;
a binder film that continuously and contiguously surrounds the plurality of tight-buffered ribbon stacks along the longitudinal axis such that the plurality of tight-buffered ribbon stacks are disposed within an interior region defined by the binder film, the interior region characterized by at least 40% of free space, wherein further the binder film is vacuum extruded about the plurality of tight-buffered ribbon stacks such that the binder film is drawn into one or more interstitial spaces between the plurality of tight-buffered ribbon stacks; and
a cable jacket having an interior surface that defines a central bore, the binder film and the plurality of tight-buffered ribbon stacks disposed within the central bore.

* * * * *